(12) United States Patent
Fin et al.

(10) Patent No.: US 10,537,204 B2
(45) Date of Patent: Jan. 21, 2020

(54) BREWING UNIT WITH A CAPSULE HANDLING MECHANISM

(75) Inventors: Giuseppe Fin, Meolo (IT); Massimo Baldo, Quinto di Treviso (IT); Marco Santini, Breda di Piave (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1497 days.

(21) Appl. No.: 14/131,438

(22) PCT Filed: Jul. 4, 2012

(86) PCT No.: PCT/IB2012/053398
§ 371 (c)(1),
(2), (4) Date: Jan. 8, 2014

(87) PCT Pub. No.: WO2013/008137
PCT Pub. Date: Jan. 17, 2013

(65) Prior Publication Data
US 2014/0130680 A1  May 15, 2014

Related U.S. Application Data

(60) Provisional application No. 61/506,243, filed on Jul. 11, 2011.

(30) Foreign Application Priority Data

Jul. 8, 2011  (EP) .................................... 11173197

(51) Int. Cl.
*A47J 31/40* (2006.01)
*A47J 31/36* (2006.01)
(Continued)

(52) U.S. Cl.
CPC ......... *A47J 31/407* (2013.01); *A47J 31/3633* (2013.01); *A47J 31/3638* (2013.01);
(Continued)

(58) Field of Classification Search
CPC .. A47J 31/407; A47J 31/3633; A47J 31/3638; A47J 31/3676; A47J 31/60; A47J 31/46; A47J 31/542
(Continued)

(56) References Cited

U.S. PATENT DOCUMENTS

| 4,724,752 A | 2/1988 | Aliesch et al. |
| 5,657,683 A | 8/1997 | Sandei et al. |

(Continued)

FOREIGN PATENT DOCUMENTS

| DE | 2800232 A1 | 7/1978 |
| EP | 0931491 A1 | 7/1999 |

(Continued)

*Primary Examiner* — Thien S Tran

(57) ABSTRACT

A brewing unit includes two brewing chamber portions movable with respect to each other, and a guide for guiding a capsule from an insertion aperture to a brewing position. The guide includes guiding channels configured to engage a flange of the capsule and a respective retention member arranged on each guiding channel for retaining the capsule in the brewing position before and during closing the brewing chamber portions, and to disengage the capsule when the brewing chamber portions are moved apart after completion of a brewing cycle. A control member is configured to space apart the retention members upon completion of the brewing cycle, so that a spent capsule is released from the guiding channels when the brewing chamber portions are moved towards an open position. The control member is configured to prevent spacing apart of the retention members when the brewing chamber portions are moved towards a closed position.

20 Claims, 14 Drawing Sheets

(51) Int. Cl.
*A47J 31/46* (2006.01)
*A47J 31/60* (2006.01)
*A47J 31/54* (2006.01)

(52) U.S. Cl.
CPC ........... *A47J 31/3676* (2013.01); *A47J 31/46* (2013.01); *A47J 31/60* (2013.01); *A47J 31/542* (2013.01)

(58) Field of Classification Search
USPC .... 99/279, 280, 281, 288, 289 P, 289 R, 295
See application file for complete search history.

(56) References Cited

U.S. PATENT DOCUMENTS

| | | | |
|---|---|---|---|
| 6,129,006 A | | 10/2000 | Schmed |
| 2002/0088348 A1* | | 7/2002 | Cortese ............... A47J 31/3638 99/295 |
| 2009/0007794 A1 | | 1/2009 | Cortese |
| 2010/0037779 A1* | | 2/2010 | Pecci ................... A47J 31/3633 99/289 R |
| 2010/0101428 A1* | | 4/2010 | Fin ...................... A47J 31/3638 99/295 |
| 2010/0173053 A1* | | 7/2010 | Ryser .................. A47J 31/3633 426/431 |
| 2011/0162530 A1 | | 7/2011 | Castellani |

FOREIGN PATENT DOCUMENTS

| | | | | |
|---|---|---|---|---|
| IT | WO 2008014830 A1 * | 2/2008 | .......... A47J 31/3633 |
| WO | 2010021532 A1 | 2/2010 | |
| WO | 2012020343 A1 | 2/2012 | |

\* cited by examiner

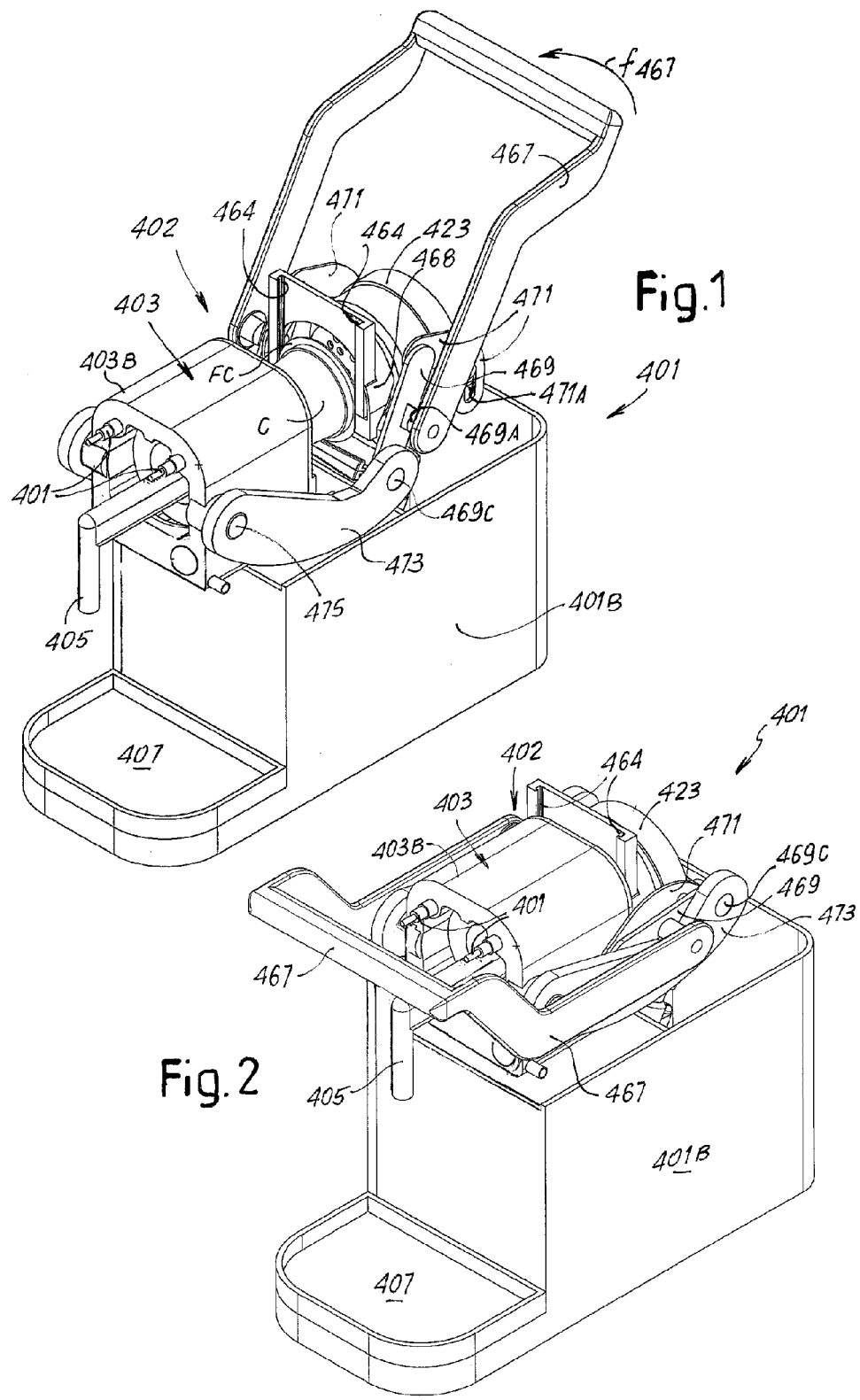

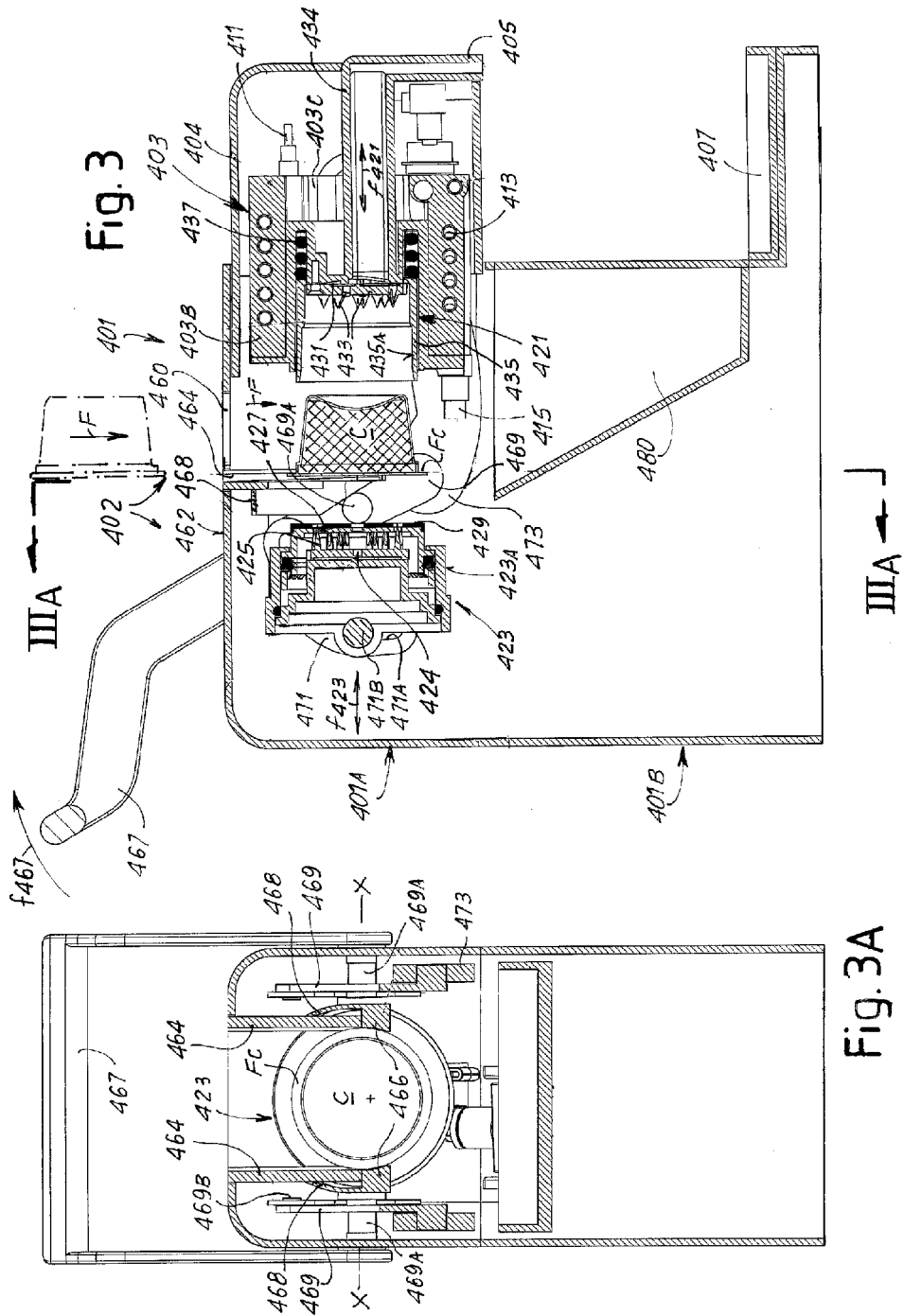

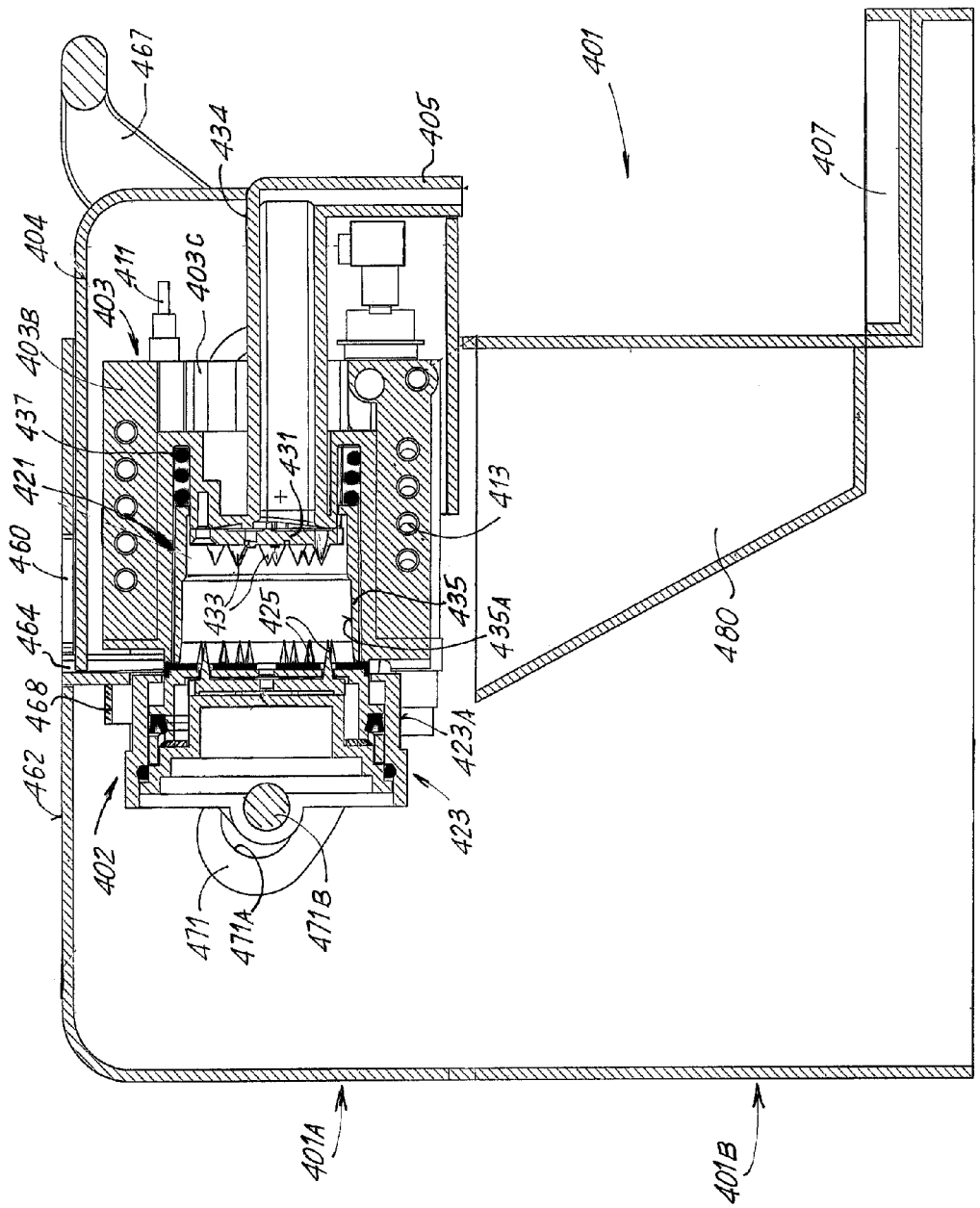

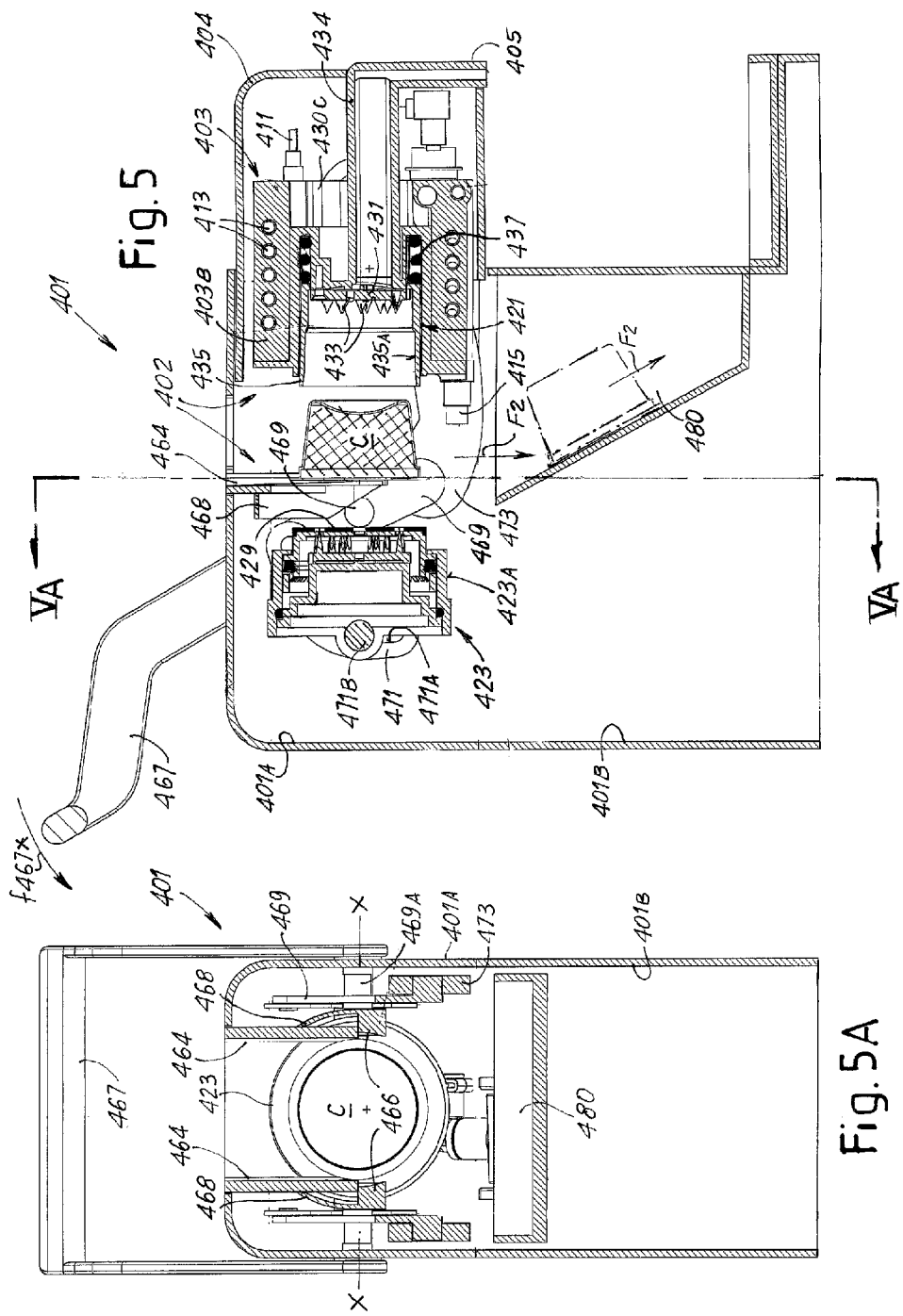

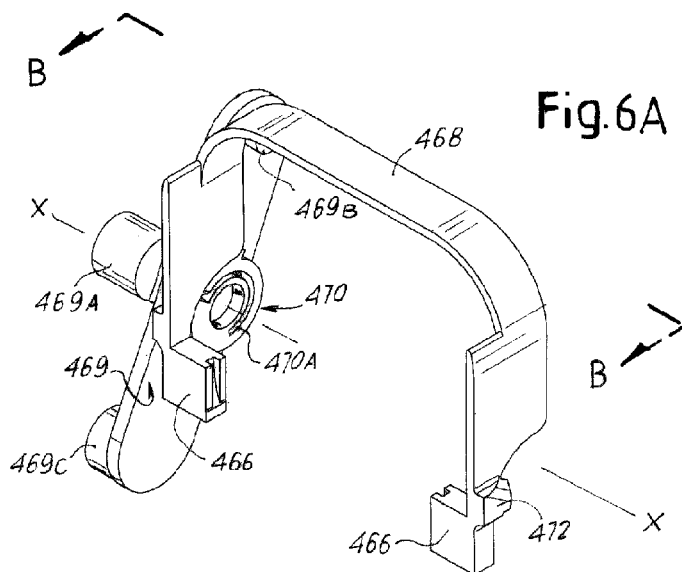
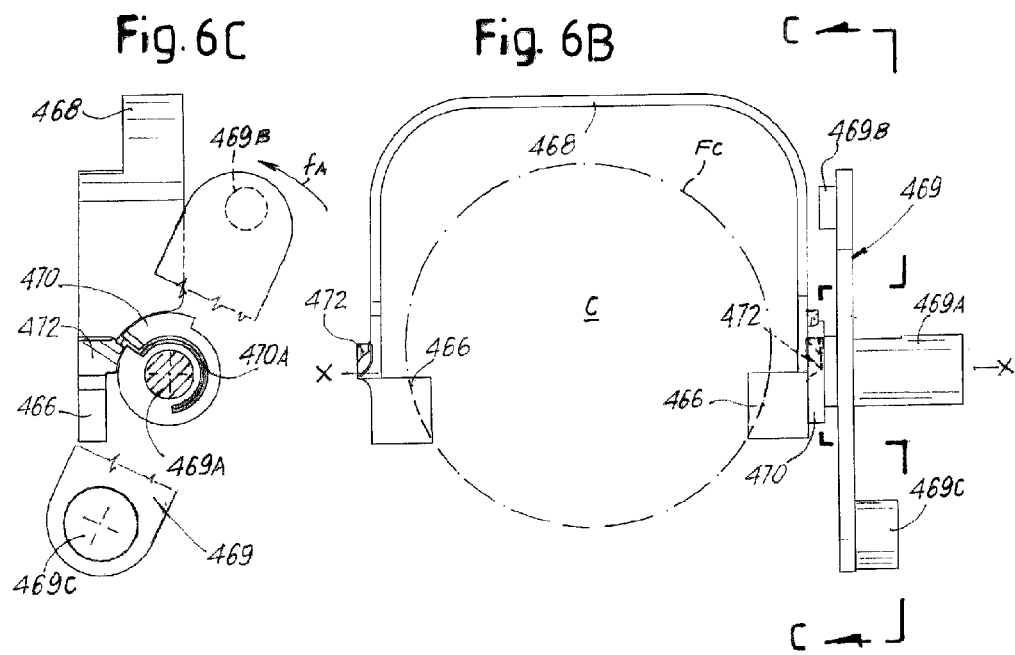

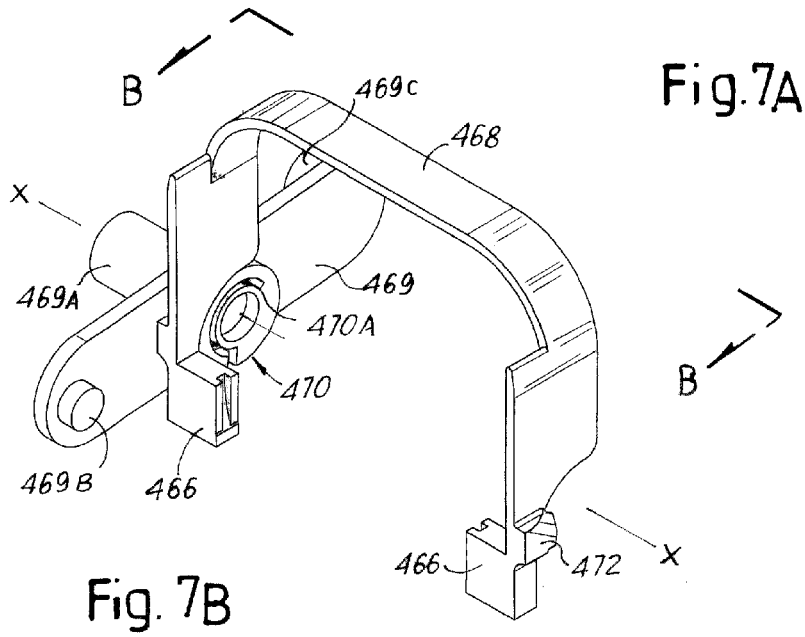
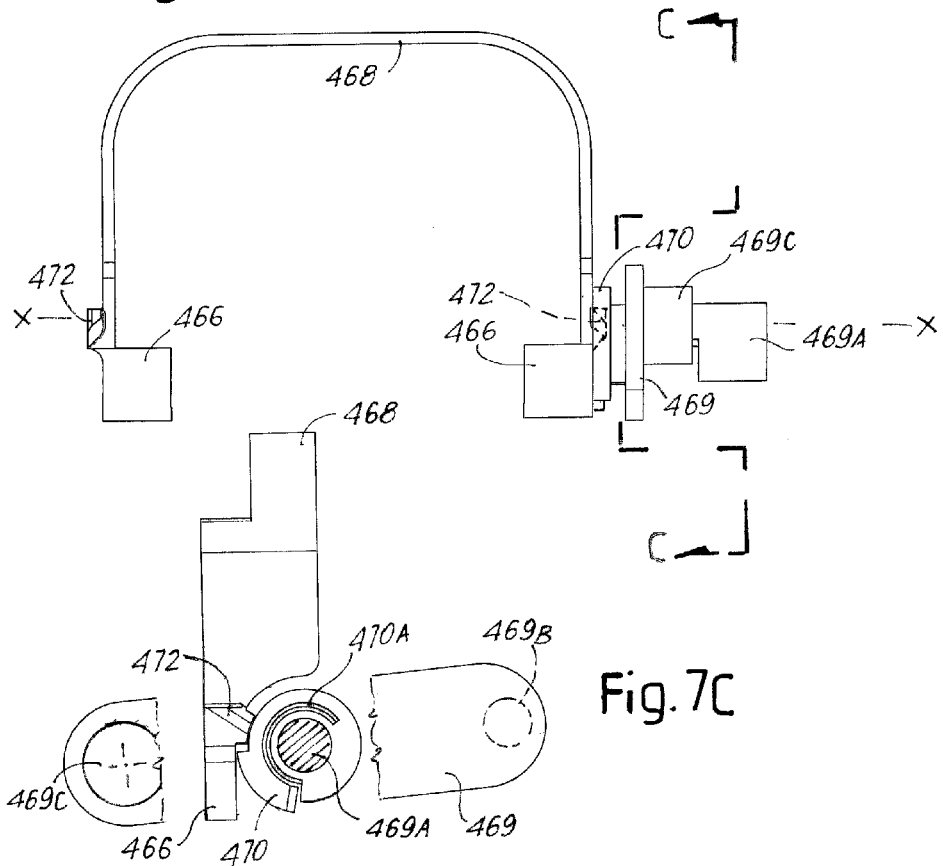

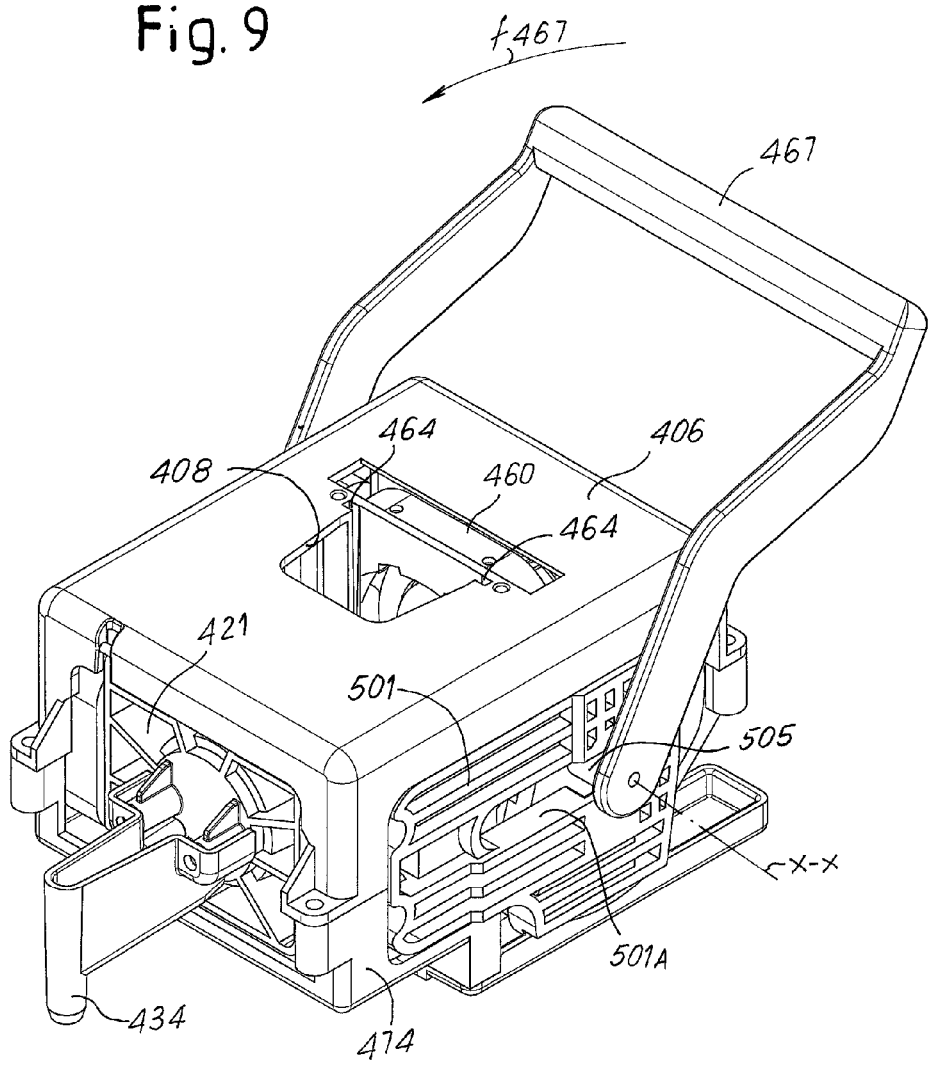

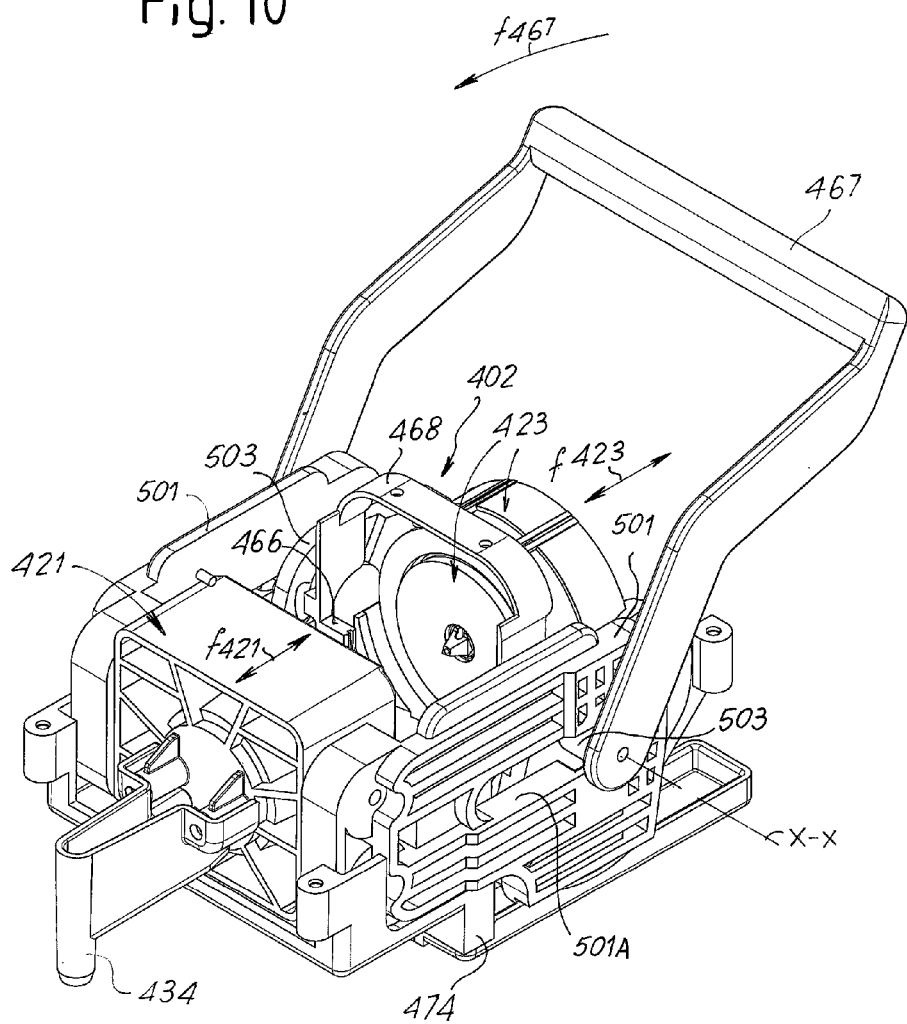

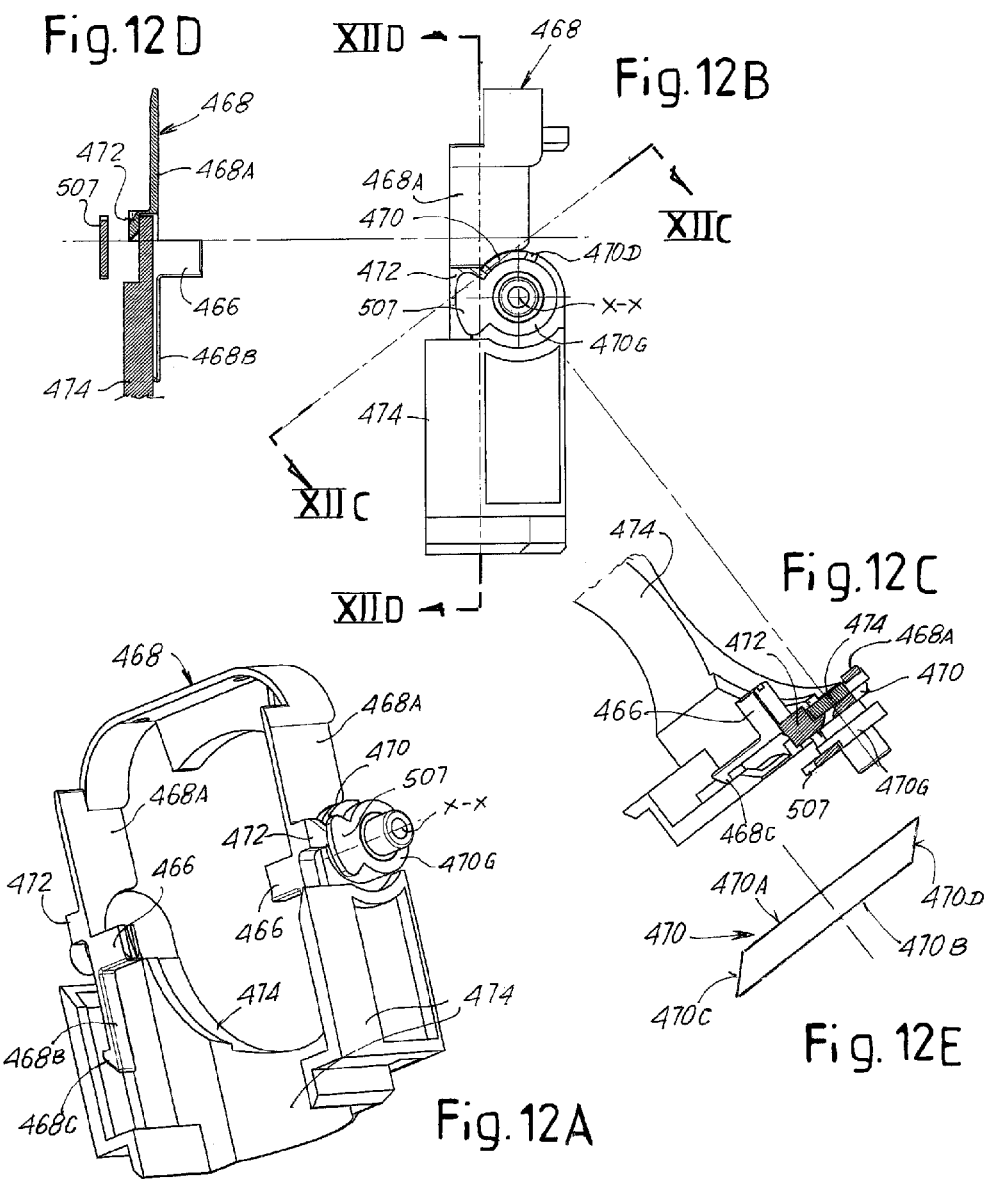

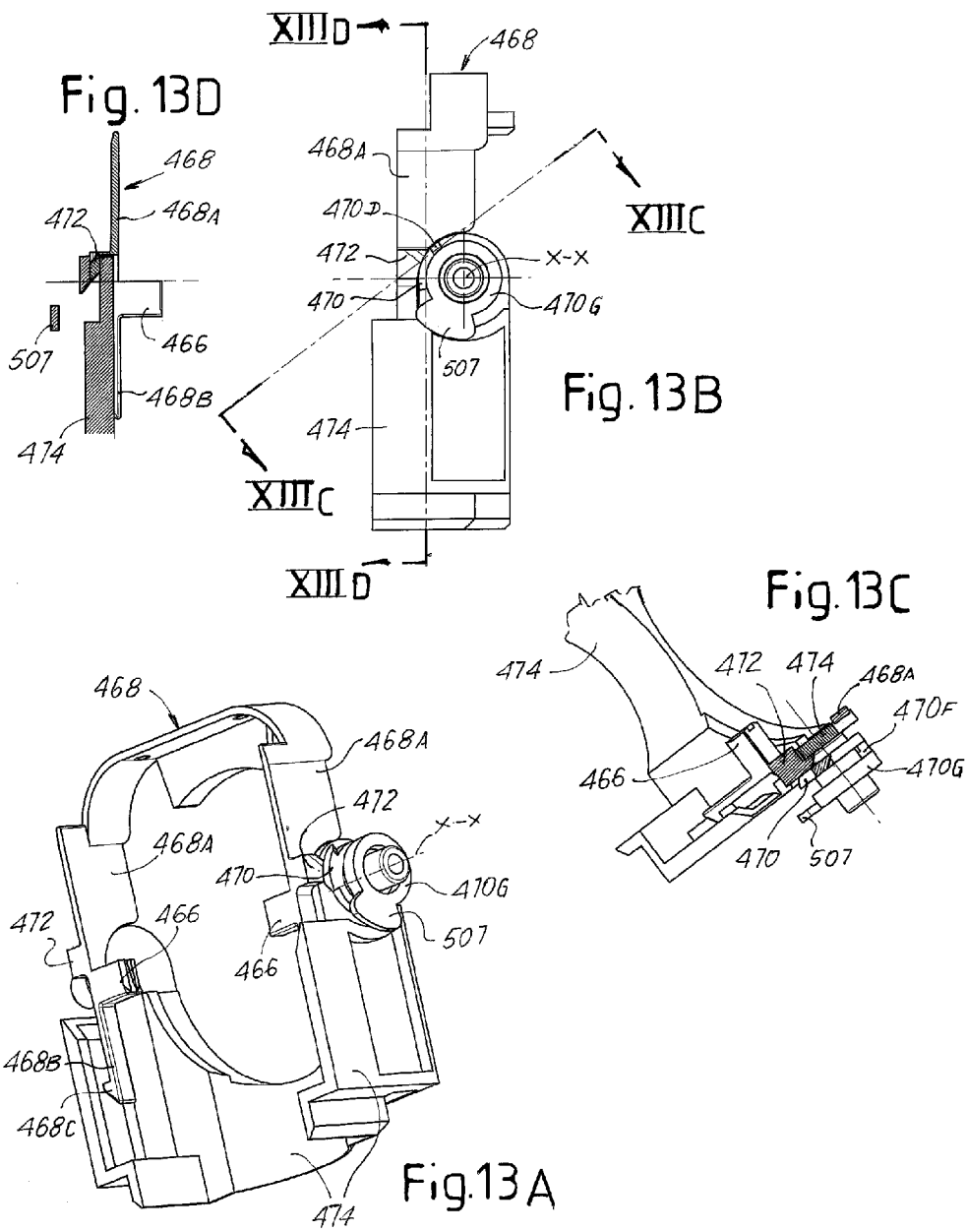

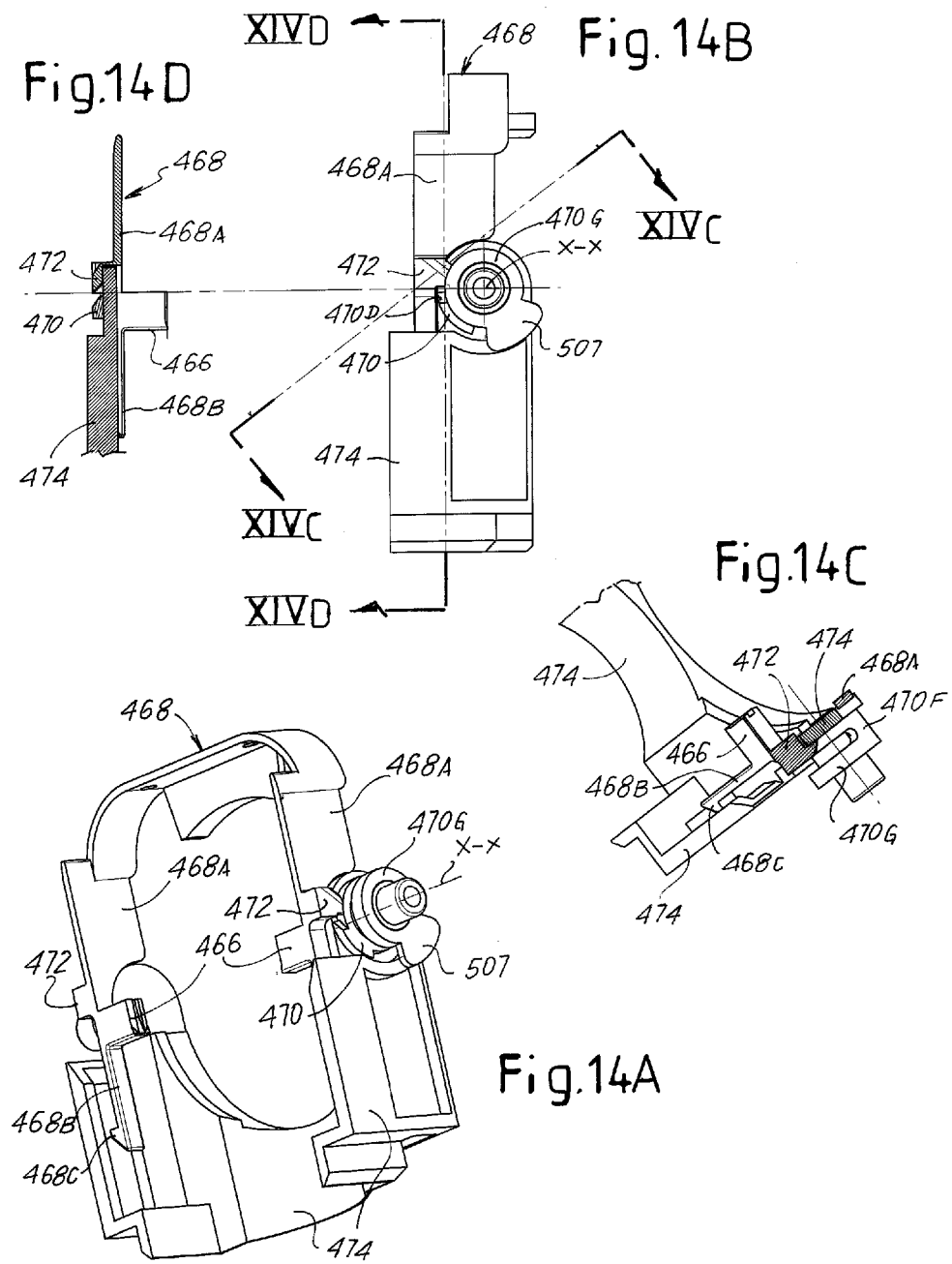

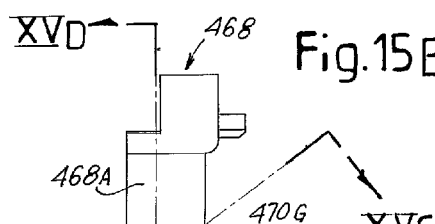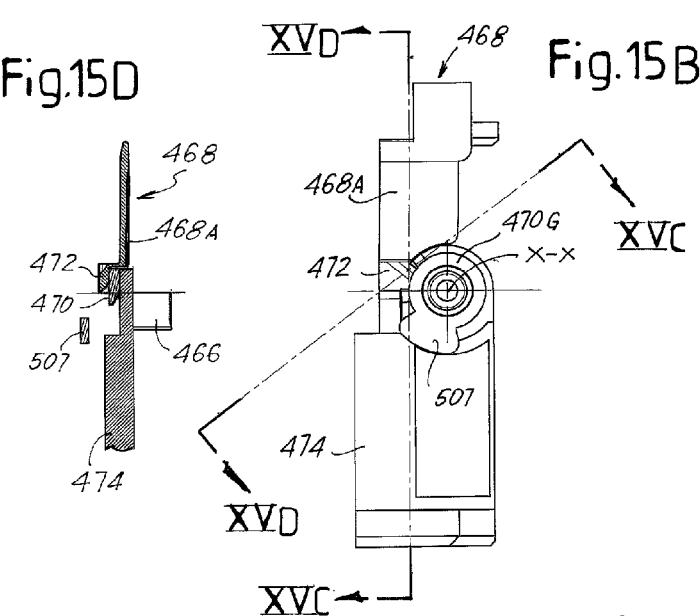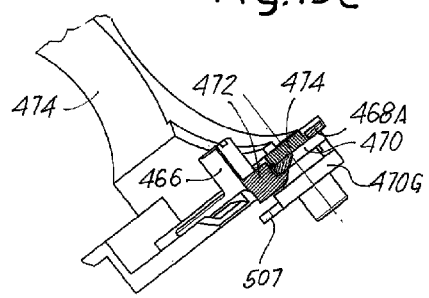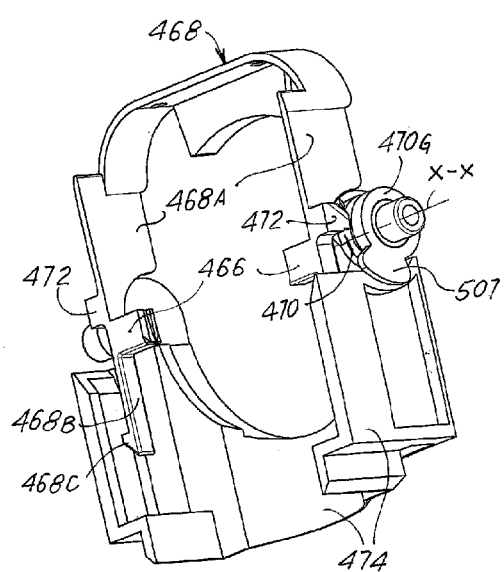

BREWING UNIT WITH A CAPSULE HANDLING MECHANISM

CROSS-REFERENCE TO PRIOR APPLICATIONS

This application is the U.S. National Phase application under 35 U.S.C. § 371 of International Application No. PCT/IB2012/053398, filed on Jul. 4, 2012, which claims the benefit of U.S. Provisionaol Patent Application No. 61/506,243, filed Jul. 11, 2011 and European Patent Application No. 11173197.2, filed Jul. 8, 2011. These applications are hereby incorporated by reference herein.

TECHNICAL FIELD

The present invention relates to a brewing unit for producing drinks such as coffee, from loose coffee powder or single-dose packagings, such as capsules or pods.

BACKGROUND ART

For producing hot drinks, for example coffee, tea, vegetable-based infusions and the like, single-dose packagings, in the form of so-called capsules, pods, cartridges or the like are often used. Here after the term "capsule" will be used to broadly designate such a single-dose packaging. It shall be understood that, unless specifically indicated, said term is to be understood as encompassing any kind of single-dose packaging suitable for preparing beverages or other edible products by extraction using hot and possibly pressurized water. A single dose packaging can include sufficient ingredients to prepare more than just one portion of beverage, e.g. two portions.

Capsules usually contain the ingredients for producing the drink. Hot water is made to flow through the capsule at an adequate pressure to extract the flavours from the ingredients contained in the capsule. There are several types of devices for handling the capsules and for the infusion or brewing phase, which is the phase of extracting the flavours from the capsules through water passage.

WO-A-2012/020343 discloses a brewing unit specifically intended for brewing coffee from capsules. The brewing unit comprises a brewing chamber with a first brewing chamber portion and a second brewing chamber portion, both movable with respect to a supporting frame. A pair of opposed guiding channels are provided for guiding a capsule in a brewing position. Lower supporting members are provided for supporting laterally the capsule and retain it in the brewing position. Both brewing chamber portions are moved towards the capsule, which remains stationary in the position reached at the end of the insertion movement along the guiding channels. After the brewing cycle has been completed, the brewing chamber is opened and the capsule is released by lifting the supporting members.

SUMMARY OF THE INVENTION

There is an increased demand for brewing units, which are compact and have reduced dimensions, especially a reduced footprint.

The present invention relates to a brewing unit, which addresses the above mentioned need. The invention also concerns a machine for producing beverages suitable for human consumption, including such a brewing unit.

According to the invention a brewing unit for the production of a beverage is provided, comprising: a brewing chamber comprising at least two brewing chamber portions movable one with respect to the other from an open position to a closed position and vice-versa; a capsule guide for guiding a capsule from a capsule insertion aperture to a brewing position, said capsule guide comprising a pair of capsule guiding channels, configured and arranged for slidingly engaging a flange or rim of the capsule; a respective capsule retention member arranged at the lower end of each capsule guiding channel for retaining the capsule in the brewing position before closing the brewing chamber and for disengaging the capsule when the brewing chamber portions are moved apart after completion of a brewing cycle; wherein both brewing chamber portions are movable with respect to said capsule guide from an open position, for receiving a capsule there between, to a closed brewing position, and vice-versa; and wherein a control member is provided, configured and arranged for spacing the said capsule retention members, e.g. upon completion of a brewing cycle, so that a spent capsule is released from the capsule retention members, and therefore from the guiding channels, when the brewing chamber portions are moved towards the open position.

This arrangement results in a particularly compact brewing unit, requiring reduced space, so that the dimensions of the machine herein the brewing unit is arranged can be small, or more space is available for additional machine components.

Within the context of the present description and enclosed claims, the term "brewing chamber" shall not be necessarily understood as being a sealingly closed chamber. Rather, the brewing chamber can also be formed by chamber portions which define a volume in which a capsule or cartridge is arranged and which is not per se sealed. The brewing chamber portions in this case retain the capsule and prevent bursting of the capsule when pressurized water flows through the capsule. However, the chamber portions surround the capsule without necessarily providing a waterproof seal around the capsule.

According to some embodiments, the control member comprises a cam profile for each retention members. The cam profiles are arranged and configured for acting on the retention members for disengaging the capsule therefrom when the brewing chamber is opened at the end of a brewing cycle. This results in a particularly compact and inexpensive arrangement, since the cam profiles can be arranged adjacent the capsule retention members, thus reducing the overall dimension of the capsule handling arrangement.

In advantageous embodiments, the control member is configured and arranged for moving both the cam profiles and the two brewing chamber portions from the open position to the brewing position, and vice-versa. This reduces the number of components of the device, simplifying the assembling process, reducing the costs and increasing the reliability of the device. Advantageously, the movement of the capsule retention members and the movement of the brewing chamber portions are synchronized with one another, so that the capsule retention members are spread apart for releasing the capsule, while the brewing chamber portions move from the closed position towards the open position, and brought again in a capsule retaining position when said brewing chamber portions are in the open position, so that a new capsule can be introduced in the brewing unit and correctly retained by the capsule retention members.

In a particularly advantageous embodiment the capsule retention members are supported along opposite prongs of an arch-shaped resilient member. The opposite prongs of the arch-shaped resilient member are spread apart by the cam profiles which control the capsule releasing movement of the capsule retention members, the spread-apart movement being obtained by resiliently deforming the arch-shaped resilient member. In this manner the two capsule retaining members and the arch-shaped resilient member are shaped as a single component, e.g. a plastic-moulded component, which is easy and inexpensive to manufacture.

In some embodiments, each capsule retention member comprises a shaped profile configured and arranged for co-acting with the respective cam profile, so that movement of the cam profiles during opening of the brewing chamber causes mutual distancing of the capsule retention members. In some embodiments, the cam profiles are resiliently deformable, so that during closure of the brewing chamber, the cam profiles move beyond the shaped profiles while the arch-shaped resilient member is prevented from being deformed. The cam profiles positively act on the capsule retention members only during the opposite movement, when the brewing chamber opens.

In some embodiments, the cam profiles can co-act with a stationary supporting structure, which prevents the deformation of the capsule profiles during the opening movement of the brewing chamber, so that the cam profiles apply a sufficient thrust on the capsule retention members to cause them to spread apart. In further advantageous embodiments, the capsule retention members and/or the shaped profiles combined therewith can co-act with said stationary supporting structure, which prevents the capsule retention members from moving closer during the brewing chamber closing movement. In this manner the shaped profiles will apply a sufficient force on the cam profiles to cause deformation thereof while the brewing chamber portions move towards the closed position.

Each cam profile can be in the form of a substantially annular-shaped cam, having opposed flat surfaces co-acting alternatively with opposed surfaces of the corresponding shaped profile of the respective capsule retention member. Annular-shaped means that the cam profile develops according to at least a portion of a circumference. The cam profile can develop around an arc of less than 180°, preferably less than 120°, more preferably less than 90°, e.g. between 20 and 60°. The cam profile can be provided with opposite beveled end edges and opposed flat surfaces. The beveled end edges and the flat surfaces of each cam profile co-act alternatively with one or the other of opposite faces of the profile of the respective capsule retention member. During the closing movement of the brewing chamber the inwardly-facing surfaces of the two cam profiles slide along the outwardly oriented faces of the profiles of the capsule retention members. The contact forces thus generated deform the cams outwardly, while inward movement of the capsule retention members is prevented. During the brewing chamber opening movement, the opposite outwardly-facing surface of each cam profile slides along the inwardly-facing surface of the corresponding profile combined with the respective capsule retention member, causing an outward movement of the capsule retention member, and thus a spreading apart of the capsule retention members.

In particularly advantageous embodiments, the cam profiles are arranged for rotation around a rotation axis adjacent the capsule retention members. For example, the rotation axis can be arranged in an intermediate position between the two brewing chamber portions, near the capsule guide, i.e. in a location arranged between the two brewing chamber portions when the latter are in the open position. The capsule handling mechanism is thus entirely located between the two brewing chamber portions, reducing the overall axial dimension of the brewing unit.

Preferably, a single control member controls movement of the cams and of both brewing chamber portions. For example, a single shaft can be provided for this purpose. The shaft can be driven by an actuator or servo-motor. Alternatively, a control lever can be provided, which can be activated manually. The control lever can rotate around the rotation axis of the cams which control the spacing apart movement of the capsule retention members.

The capsule guiding channels are arranged such that the capsule can be introduced by gravity, e.g. vertically. The brewing chamber portions are arranged and controlled to move from the open position to the closed position and vice-versa, with a movement along a substantially horizontal direction, the capsule in the brewing position being advantageously maintained with the axis thereof in a substantially horizontal attitude. The axis of the capsule is to be understood as the center line thereof, orthogonal to the top and bottom surfaces of the capsule, through which the brewing water and the beverage flow.

In some embodiments, the brewing unit comprises a water heater, preferably a flow through or instant water heater, which is movable along with one of the brewing chamber portions during closing and opening of the brewing chamber. The brewing chamber portion which is movable with the water heater can be advantageously in thermal contact with said water heater, so that the brewing chamber is heated before a brewing cycle starts.

Additional features and advantageous embodiments of the invention are set forth in the appended claims, which form an integral part of the present disclosure, and will be described in detail reference being made to the drawings.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 1 and 2 show axonometric views of a coffee machine according to an embodiment of the invention, in an open and closed position respectively, with some parts of the outer housing being removed;

FIGS. 3, 4 and 5 show sections of the machine of FIGS. 2 and 3 in three different operative conditions;

FIGS. 3A and 5A show cross sections along lines III-III and V-V in FIGS. 3 and 5 respectively;

FIGS. 6A-8C show details of one embodiment of a capsule retention and ejection system of the machine illustrated in FIGS. 1 to 5, in different positions;

FIG. 9 shows a perspective view of a brewing unit for a coffee machine, according to a further embodiment of the invention;

FIG. 10 shows a perspective view of the brewing unit of FIG. 9 with parts removed to show the inner components of the brewing unit;

FIG. 12A shows a perspective view of the capsule retention and ejection system of the brewing unit of FIGS. 9 to 10, in the position taken when the brewing chamber is entirely open;

FIG. 12B shows a side view of the system of FIG. 12A;

FIGS. 12C and 12D show sectional views according to line C-C and D-D of FIG. 12B;

FIG. 12E shows a schematic top view of the cam profile used for controlling the moving part of the capsule retention members;

FIGS. 13A-13D show views similar to FIGS. 12A-12D, in an intermediate position taken during the closing movement of the brewing chamber;

FIGS. 14A-14D show views similar to FIGS. 13A-13D, in the position taken when the brewing chamber is completely closed; and FIGS. 15A-15D show views similar to FIGS. 14A-14D, in an intermediate position taken during the opening movement of the brewing chamber.

DETAILED DESCRIPTION OF EMBODIMENTS THE INVENTION

Figure 8A:
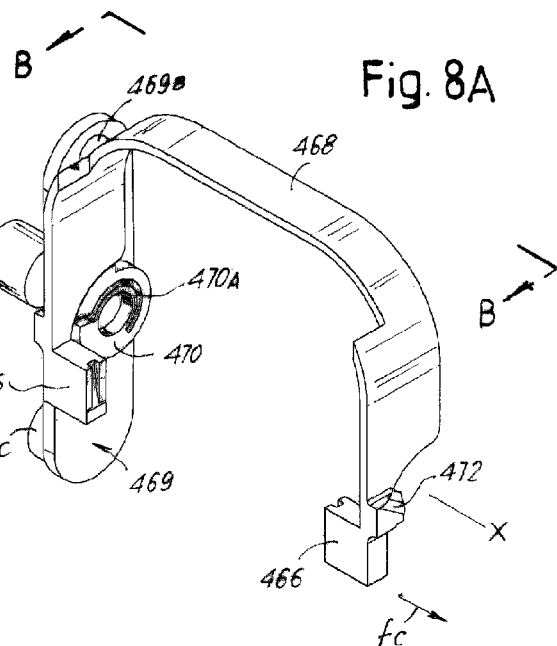

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Hereinafter reference will specifically be made to brewing units for coffee machines using pre-packaged capsules for the preparation of coffee beverages. However it should be understood that the invention can be embodied also in brewing units for the preparation of different kinds of beverages suitable for human consumption by means of extraction with preferably hot and pressurized water from a capsule. A beverage is to be understood broadly as including any substantially liquid edible product. A capsule shall be understood as any package containing ingredients for the production of a beverage, provided with a flange or rim surrounding the package, which can be engaged in guiding channels provided in the brewing unit. The capsule can be sealed, or can have top and/or bottom surfaces which are liquid-pervious.

A first embodiment of a brewing unit according to the invention is shown in FIGS. 1 to 8C.

FIGS. 1 and 2 show two axonometric views of a beverage producing machine 401 including a brewing unit 402 embodying the invention. Some parts of the outer housing of the machine have been removed in order to show inner components of the brewing unit. In FIG. 1 the brewing unit is in the open position, i.e. with the brewing chamber open for receiving a capsule. In FIG. 2 the brewing unit is in the closed position, i.e. with the brewing chamber closed for performing a brewing cycle.

In this embodiment the brewing unit 402 includes a water heater 403. In this embodiment the water heater is placed frontally and in the upper part of the machine 401 and is covered by an upper portion 401A of the housing (removed in FIGS. 1 and 2) and by a frontally arranged slidable cover 404, also removed in FIGS. 1 and 2 and shown in FIGS. 3-5. A coffee dispensing spout 405 is provided in the front part of the machine 401, above a drip tray 407 connected to the lower part 401B of the machine housing.

In other embodiments the water heater 403 can be arranged in a different position, e.g. in the rear part of the machine. In some embodiments the water heater 403 is an instant, i.e. a flow-through water heater, comprising a main body 403B, e.g. formed by a block made of metal, such as aluminium or an aluminium-based alloy, or other heat-conductive material. In the main body 403B an electric resistor 411 and a water duct 413 are embedded. Both the electric resistor 411 and the water duct 413 can be helically wound around an axis of the body 403B of the water heater 403. The input end of the water duct 413 is connected via a connecting pipe to a water pump (not shown).

In some embodiments the brewing chamber comprises two portions. In the embodiment shown in FIGS. 1-5 the brewing chamber includes a first brewing chamber portion 421 and a second brewing chamber portion 423. In this embodiment the first brewing chamber portion 421 is mounted in a cavity 403C provided inside the block forming the body 403B of the water heater 403. Preferably the first brewing chamber portion 421 and the water heater 403 are fixed one with respect to the other and in mutual thermal contact. In thermal contact means that heat can be transmitted from the main body 403B of the water heater 403 to the first brewing chamber portion 421 by conduction, such that the water heater 403 can keep the brewing chamber portion 421 at a temperature above ambient temperature due to heat conduction.

As will be explained later on, the water heater 403 is movable along with the chamber portion 421 with respect to the housing of the coffee machine 401 according to double arrow f421 (see FIG. 3), along a direction substantially parallel to the axis A-A of the brewing chamber, in order to close and open the brewing chamber. In this embodiment, also the second brewing chamber portion 423 is movable with respect to the first brewing chamber portion 421 and with respect to the housing of the coffee machine 401 according to the double arrow f423 (see FIG. 3) along a direction substantially parallel to the axis A-A of the brewing chamber. In this embodiment the axis A-A is substantially horizontal.

In other embodiments, the first brewing chamber portion 421 can be supported separately of the water heater, and the water heater can be arranged in a different location in the machine 401. In some embodiments, the water heater can be stationary with respect to the housing of the machine, rather than being movable with the brewing chamber portion. 421.

One or both said brewing chamber portions 421, 423 can be provided with perforation means for perforating a capsule C containing the ingredients for producing the coffee beverage, or any other edible product by infusion. In other embodiments, only one or neither one nor the other of the two brewing chamber portions can be provided with perforation means, depending upon the structure of the capsule. E.g. if the capsule has a water-pervious top wall and/or a water-pervious bottom wall, one or both perforation means can be dispensed with. Here below one possible structure of the perforation means is described. Other means can be provided to generate one or more apertures in the top and/or bottom wall of a capsule.

In the embodiment shown in the drawings the second brewing chamber portion 423 is provided with perforators 425 extending through holes provided in a disc member 427 slidably arranged in the second brewing chamber portion 423. The disc member 427 is provided with a seal 429 co-acting with an annular edge of the opposite brewing chamber portion 421. When the brewing chamber is closed and the brewing cycle starts, hot pressurised water flowing from the water heater 403 and exiting the connector 415 enters the brewing chamber through a duct 424 provided in the second brewing chamber portion 423. The pressurized hot water flows through the holes provided in the disk member 427 and enters the capsule C through apertures punched in the top surface of the capsule by the perforators 425.

Springs (not shown) push the disc member 427 away from the bottom of the housing formed by the outer substantially cylindrical wall of the second brewing chamber portion 423, such as to remove the capsule C from the perforators 425 after brewing has taken place.

The first brewing chamber portion 421 is cup-shaped and near the bottom thereof a plate 431 is arranged, which is provided with perforating protrusions 433. The protrusions 433 are apertured such that the beverage extracted from the ingredients contained in the capsule C exits the brewing chamber through passages extending along the protrusions 433 and is dispensed through a dispensing duct 434 in fluid communication with the dispensing spout 405.

A substantially cylindrical hollow member 435 can be housed inside the brewing recess of the first chamber portion 421. The cylindrical hollow member 435 can be provided with an inner wall 435A having a shape reproducing the shape of the outer side surface of the capsule C, in the illustrated example an approximately frustum-conical shape. The hollow member 435 is elastically biased by a spring 437 arranged between the cylindrical hollow member 435 and the bottom of the first brewing chamber portion 421. Said cylindrical hollow member 435 acts as an ejector to eject the capsule C from the interior of the first brewing chamber portion 421 after brewing.

The dispensing duct 434, from which the beverage is dispensed extends along the inner cavity 403C provided in the body 403B of the water heater 403 up to the dispensing spout 405. This special arrangement ensures that the dispensing duct 434 is heated up and is brought at an above-ambient temperature even before the first brewing cycle is performed. Heating of the dispensing duct 434 is achieved by heat convection from the water heater 403. The intimate contact between the brewing chamber portion 421 and the body 403B of the water heater 403 is such that the larger one (421) of the two brewing chamber portions 421, 423 is heated by the same resistor which heats the brewing water before the brewing cycle starts. Both measures result in a hot beverage being dispensed already from the very first beverage portion dispensed by the machine 401.

According to the embodiment shown in FIGS. 1 to 5 the capsule C is introduced into the brewing chamber by gravity. For that purpose, an aperture or slot 460 is provided on a top surface 462 of the machine housing. The capsule C is caused to fall according to arrow F1 (FIG. 3) through the aperture or slot 460. The capsule is guided along downwardly extending capsule guiding channels 464, in which the annular flange or rim Fc of the capsule engages. A capsule retention member 466 is arranged at the lower end of each capsule guiding channel 464. The distance between the two opposing capsule retention members 466 is normally less than the outer diameter of the capsule flange or rim Fc, such that a new capsule introduced in the capsule guiding channels 464 reach its final position shown in FIGS. 3, 3A and in said position it will rest with the flange or rim Fc against said capsule retention members 466 as shown in FIG. 3A. This is the final brewing position. The capsule will remain in this position during the brewing cycle. The brewing chamber is closed by moving both brewing chamber portions 421, 423 towards the capsule.

The closing movement of the brewing chamber portions 421, 423 can be controlled in various ways, e.g. with electric or hydraulic actuators. According to one embodiment, shown in the figures, a simple hand-operated mechanical arrangement can be used for this purpose. The arrangement includes a control lever 467 which is hinged around a rotation axis X-X, which is fixed with respect to the housing of the coffee machine. The rotation of the control lever 467 causes rotation of a pair of double cranks 469 around pivots 469A coaxial to the rotation axis X-X. The two double cranks 469 are hinged at one end (469B) to a pair of slotted L-shaped rocker arms 471, each of which is provided with a curved slot 471A. A transverse pin 471B rigidly connected to the second brewing chamber portion 423 has opposite ends, which are slidingly engaged into the curved slots 471A. Rotation of the control lever 467 around the axis X-X causes, therefore, a translation movement according to arrow f423 (FIG. 3) of the second brewing chamber portion 423.

The first brewing chamber portion 421 is mechanically connected to opposite ends of the two double cranks 469 by means of a pair of rocker arms 473. Each rocker arm 473 is hinged at one end to a pivot pin 469C of the respective double crank 469 and at the opposite end to a pivot 475 rigidly constrained to the water heater 403. With such arrangement, rotation of the control lever 467 causes a sliding movement according to double arrow f421 (FIG. 3) of the water heater 403 and of the first brewing chamber portion 421 constrained thereto.

Thus, actuation of the control lever 467 causes the simultaneous movement of both brewing chamber portions 421 and 423 towards the capsule C and away therefrom, in order to close and open the brewing chamber.

The movement of the control lever 467 causes also actuation of means for ejecting the capsule C once the brewing cycle has terminated, as disclosed here below.

A possible embodiment of a system for retaining a capsule before closure of the brewing chamber and ejecting the spent capsule upon completion of the brewing cycle is shown in FIGS. 6A-8C. These figures show the mechanism in isolation and with some parts removed for a clearer representation, in various positions during movement of the brewing unit.

Figure 8C:
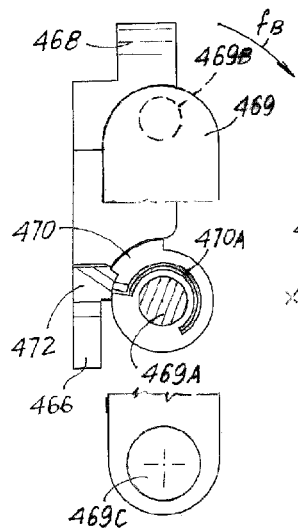
Figure 8B:
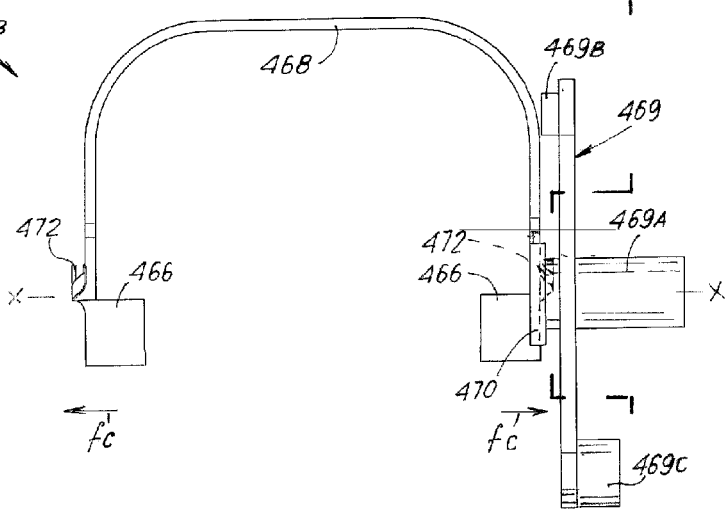

More specifically, FIGS. 6A, 6B and 6C show views from different points of observation of the mechanism in the position taken for receiving a fresh capsule when the brewing chamber is open. If the movement of the brewing unit is controlled by a control lever, such as control lever 467, the position of FIGS. 6A-6C correspond to the position taken by the control lever 467 in FIG. 1. FIGS. 7A-7C show the same view of the mechanism in the position taken when the brewing chamber is closed, corresponding to the position of FIG. 2. FIGS. 8A-8C show the same views of the mechanism in the position taken during opening of the brewing chamber after a brewing cycle has been completed, before reaching the final, entirely open position (FIG. 1; FIGS. 6A-6C).

In the exemplary embodiment shown in FIGS. 6A-8C the two capsule retention members 466 are supported at opposite ends of two downwardly extending prongs of an arch-shaped resilient member 468 which co-acts with the two double cranks 469. In FIGS. 6-8 only one of the two double cranks 469 is shown for the sake of clarity. Each double crank 469 is integral with a cam profile 470 coaxial to pivot 469A. Each cam profile 470 is slotted at 470A such as to be elastically deformable. Each cam profile 470 co-acts with a shaped profile 472 integral with or rigidly connected to the corresponding retention member 466.

In other embodiments, not shown, a different mechanism can be used for opening and closing the brewing chamber. In such case the double cranks 469 could be omitted and the cams 470 could be controlled by a motorized shaft or a pair of motorized shafts.

In FIGS. 6A-6C each cam profile 470 is arranged above the profile 472 of the corresponding capsule retention member 466, see in particular FIG. 6C. When the double cranks 469 are pivoted around the pivots 469A according to arrow fA (FIG. 6C) by turning the control lever 467 around the rotation axis X-X according to arrow f467 (FIG. 1 and FIG. 3), the two cam profiles 470 rotate around axis X-X until they reach the position shown in FIGS. 7A-7C. This is made possible in that the cam profiles 470 are elastically deformable thanks to the slots 470A. The rotation movement from the open position (FIGS. 6A-6C) to the closed position (7A-7C) of the brewing unit causes the cam profiles 470 to pass from a position above the profiles 472 (FIG. 6A) to a position below said profiles 472 (FIG. 7A) thanks to the deformation of the cam profiles 470, while the capsule retention members 466 and the arch-shaped resilient member 468 are prevented from being deformed due to the capsule arranged therein. What actually happens, is that the cam profiles 470 slide against the outwardly facing surface of the profiles 472, the latter being prevented from moving inwardly (i.e. towards the center line of the brewing unit) by the presence of the capsule rim engaging with the retention members 466 (see dashed line in FIG. 6B).

When the brewing chamber is opened after a brewing cycle has been completed, by acting on the control lever 467 and rotating it according to arrow f467X (FIG. 5), the capsule retaining and ejecting mechanism moves from the position shown in FIGS. 7A-7C back to the position of FIGS. 6A-6C passing through the position shown in FIGS. 8A-8C, see arrow fB in FIG. 8C. The cam profiles 470 co-act with the profiles 472 sliding along the inwardly facing surfaces thereof, pushing them outwardly. This movement causes an elastic outward deformation of the opposite ends of the arch-shaped resilient member 468 to an extension sufficient to release the capsule C retained by the capsule retention members 466. The cam profiles 470 keep the resilient member 468 in the outwardly deformed condition until the two brewing chamber portions 421, 423 are sufficiently moved apart from one another, such that they do not retain the spent capsule C anymore. The latter will consequently fall by gravity into a collection tray 480. Before reaching the final, entirely open position of FIGS. 1 and 2, corresponding to the position of FIGS. 6A-6C, the cam profiles 470 will disengage the profiles 472, so that the capsule retention members 466 will move again closer to one another in a position suitable for retaining the new capsule.

FIGS. 9 to 15D show a second embodiment of a brewing unit according to the invention. The same or corresponding parts, elements or components as in the previously described embodiment are indicated with the same reference numbers.

The brewing unit, designated 402 as a whole (FIG. 10), is arranged under a cover 406 (FIG. 9) which is partly removed in FIG. 10 to show the inner components of the brewing unit. The cover 406 has a slot or aperture 408 through which the capsules C are introduced in the brewing unit.

The brewing unit 402 comprises a brewing chamber comprised of a first brewing chamber portion 421 and a second brewing chamber portion 423 (FIG. 10). The first brewing chamber portion 421 is movable according to double arrow f421 and the second brewing chamber portion 423 is movable according to double arrow f423, under the control of an actuator, for example a control lever 467, as will be described later on. In the embodiment shown in FIGS. 9 and 10 the coffee is dispensed from the brewing chamber through a dispensing duct 434.

The cover 406 is provided with downwardly extending capsule guiding channels 464, in which the annular flange or rim Fc of the capsule engages and by which the capsule is guided towards a brewing position after insertion in the slot or aperture 408. In the embodiment shown in FIG. 9, the capsule guiding channels 464 are integrally formed with the cover 406, e.g. moulded as one piece therewith. In other embodiments, the capsule guiding channels 464 can be formed as separate components mounted on the cover 406 or on another stationary component of the machine.

A respective capsule retention member 466 is arranged at the lower end of each capsule guiding channel 464, see FIG. 10 and FIG. 12A. Similarly to the previously described embodiment, each capsule retention member 466 comprises a curved slit, in which the rim or flange Fc of a capsule C, which has been introduced through aperture 408 and guided along the capsule guiding channels 464, engages.

The two capsule retention members 466 are supported by an arch-shaped resilient member 468, which can be engaged to the cover 406. The arch-shaped resilient member 468 has two downwardly oriented prongs 468A (see in particular FIG. 12A), ending with appendages 468B. The appendages 468B can be provided with respective teeth 468C resting against a stationary supporting structure 474 (see FIGS. 9, 10 and 12A). In this embodiment the capsule retention members 466 are therefore located in intermediate positions along the downwardly oriented prongs 468A of the arch-shaped resilient member 468, rather than at the end thereof, as in the previously described embodiment.

Each capsule retention member 466 is provided with a shaped profile 472, best shown in FIGS. 12A-12D. The shaped profiles 472 co-act with respective rotating cam profiles 470. In the exemplary embodiment described herein, the cam profiles 470 are controlled by the control lever 467 and rotate around the rotation axis X-X of said control lever 467, as will be described in greater detail later on. The cam profiles 470 are configured and controlled to move apart the capsule retention members 466 during the opening movement of the brewing chamber portions 421, 423, in order to discharge a spent capsule from the brewing position, and to position the capsule retention members 466 again in a capsule receiving position when the brewing chamber is in its fully opened position. The operation of the cam profiles 470 will be described in greater detail later on.

The control lever 467 controls the movement of the cam profiles 470 and of the brewing chamber portions 421, 423 as follows.

Figure 11:
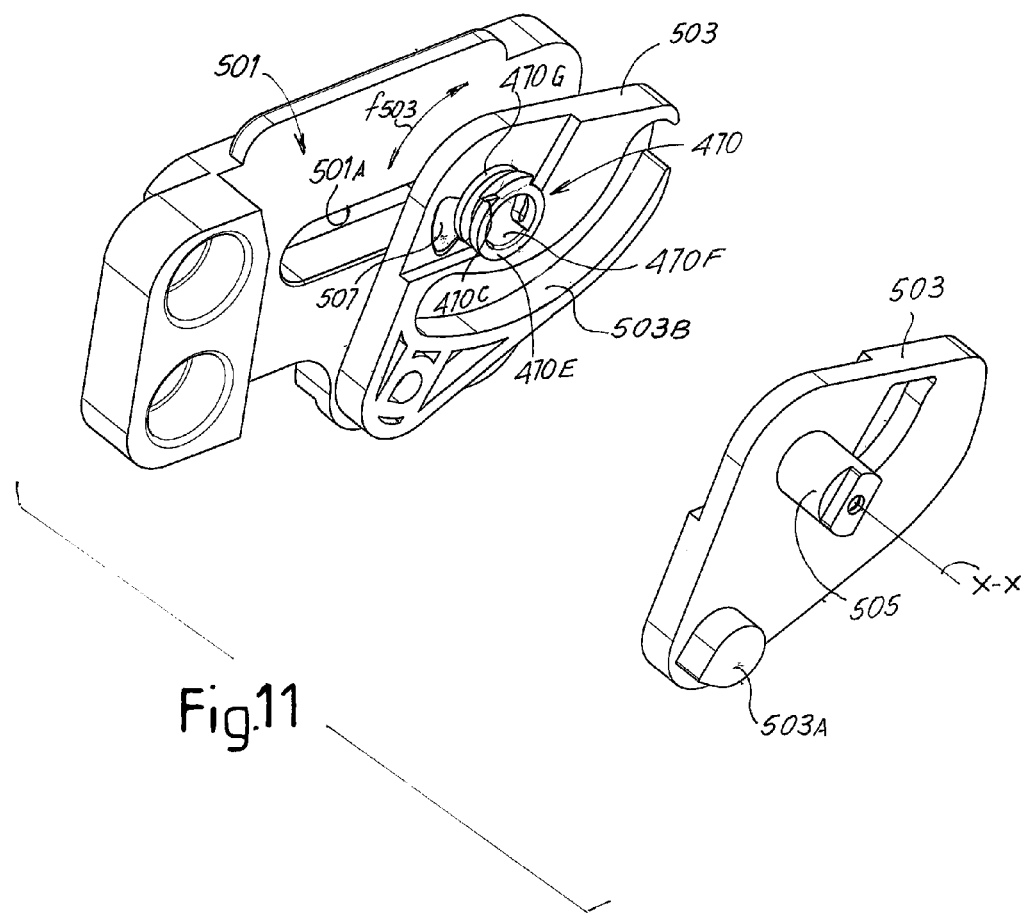
FIG. 11 shows an exploded view of parts of the members which transmit the rotary movement of a control lever to the brewing chamber portions in the brewing unit of FIGS. 9 and 10.

The first brewing chamber portion 421 is constrained to two side panels 501, one of which is shown separate from the brewing chamber portion 421 in FIG. 11. The two side panels 501 are slidingly engaged to the supporting structure 474 and to the cover 406. A respective crank 503 is located adjacent each side panel 501 and on the inner side thereof, see FIG. 10. In FIG. 11 the two cranks 503 and one side panel 501 are shown in isolation. Each crank 503 is provided with a pin 505 (FIG. 11), which is torsionally connected to the lever 467 and rotatingly supported on the stationary supporting structure 474. Each pin 505 extends through a rectlinear and horizontally extending slot 501A provided in the respective side panel 501, so that the side panels 501 can move along with the first brewing chamber portion 421 (arrow f421, FIG. 10) during the opening and closing of the brewing chamber, while the pins 505 rotate around the stationary rotation axis X-X of the control lever 467.

Each crank 503 is provided with a respective pivot 503A, engaging with the respective side panel 501. In this way, when the cranks 503 rotate according to arrow f503 (FIG. 11) around the rotation axis X-X, the side panels 501, and the first brewing chamber portion 421 constrained thereto, move in the direction f421.

Each crank 503 is further provided with a channel-shaped cam 503B engaging a feeler (not shown) constrained to the second brewing chamber portion 423. The rotation of the cranks 503 thus control also a closing and opening movement according to double arrow f423 (FIG. 10) of the second brewing chamber portion 423. The different shapes of the members transmitting the rotary motion of the control lever 467 to the two brewing chamber portions 421, 423 causes said brewing chamber portions to perform different strokes. More specifically, the opening and closing stroke of the first brewing chamber portion 421 is much longer than the opening and closing stroke of the second brewing chamber portion 423.

Each crank 503 further engages a key 507 which is torsionally constrained to the corresponding cam profile 470. The rotation of the control lever 467 thus control also the rotary motion of the cam profiles 470.

As can be appreciated in particular from FIGS. 12B, 12C, 13B, 13C, each cam profile 470 is substantially shaped as a portion of a circle. Each cam profile has two opposed flat surfaces 470A, 470B, which are orthogonal to the rotation axis X-X of the cam profile 470, a first end edge 470A and a second end edge 470B. The two edges can be planar and are inclined with respect to the opposite flat surfaces 470A, 470B. The shape of the cam profiles 470 can best be appreciated from the enlargement and schematic representation in FIG. 12E, showing one of the cam profiles in a top view, orthogonal to the rotation axis X-X thereof. The flat surfaces 470A of the cam profiles 470 are facing inwardly, while the flat surfaces 470B are facing outwardly.

As can be seen in FIGS. 11 and 12C, the cam profile 470 is actually formed on a ring 470E which is cantileverly supported by a connection 470F integral to a disk 470G, integrally formed with the key 507. The connection 470F is resiliently flexurally deformable for the purposes which will become clear from the following description of the operation of the capsule retention members 466 and cam profiles 470.

In FIGS. 12A-12D the capsule retention members 466 and the cam profiles 470 are in the position corresponding to the fully open position of the brewing chamber, as shown in FIG. 10. The cam profiles 470 are located above and sideways of the profiles 472 of the capsule retention members 466 and do not co-act therewith. In this position a capsule C can be introduced through the aperture 408 (FIG. 9) and falls by gravity along the capsule guiding channels 464, with the capsule rim Fc engaged therewith. The capsule will stop at the end of the capsule guiding channels 464 when the rim engages the capsule retention members 466. In order to prevent an accidental outward resilient deformation of the arch-shaped resilient member 468 due to the capsule impact against the capsule retention members 466, the teeth 468C at the ends of the appendages 468B are provided. These teeth contact the stationary supporting structure 474 and will prevent any flexural deformation of the prongs 468A of the arch-shaped resilient member 468 due to the impact of the capsule. The position of the cam profiles 470 with respect to the profiles 472 and the capsule retention members 466 is shown in FIGS. 12A-12D.

The brewing chamber can now be closed. The closing movement is driven by rotating the control lever 467 according to arrow f467 (FIGS. 9, 10). The rotation of the control lever 467 around the rotation axis X-X causes the sliding movement of the first brewing chamber portion 421 (arrow f421, FIG. 10) and of the second brewing chamber portion 423 (arrow f423, FIG. 10), towards the capsule, which remains stationary in the brewing position defined by the capsule retention members 466. The movement of the control lever 467 is transmitted to the brewing chamber portions 421, 423 by the cranks 503 and the side panels 501 as described above.

The control lever 467 rotates also the cam profiles 470. FIGS. 13A-13D show an intermediate position of the cam profiles 470 during the closing movement of the brewing chamber 421, 423. Each cam profile 470 slides with the beveled edge 470C and subsequently with the inwardly facing flat surface 470A thereof along the outwardly facing surface of the respective profile 472. The inward movement of the profiles 472 is prevented on the one side by the capsule being engaged between the capsule retention members 466 and on the other side, if required, also by the profiles 472 resting on a portion of the stationary supporting structure 474 (see in particular FIG. 13C). The cam profiles 470 are thus forced to deform resiliently outwardly while sliding along the outer surfaces of the profiles 472.

FIGS. 14A-14D show the final position of the cam profiles 470 at the end of the closing movement, i.e. when the brewing chamber is entirely closed. The cam profiles 470 have moved under the profiles 472.

After the brewing cycle has been completed, the control lever 467 can be rotated in the opposite direction to open the brewing chamber. FIGS. 15A-15D show an intermediate position taken by the cam profiles 470 and by the capsule retention members 466 during the opening movement. As can be appreciated in particular from FIG. 15C, each cam profile 470 slides now with the inclined beveled edge 470D and subsequently with the outwardly oriented flat surface 470B along the inwardly oriented surface of the profile 472. The thrust exerted by the cam profiles 470 deforms outwardly the prongs 468A of the arch-shaped resilient member 468. The resilient deformation moves the capsule retention members 466 apart from one another to an extent sufficient to release the rim Fc of the spent capsule from the capsule retention members 466. The cam profiles 470 are prevented from being deformed e.g. by sliding with the inwardly oriented flat surface 470A thereof against a portion of the stationary supporting structure 474 (see FIG. 15C). The appendages 468B provided at the ends of the downwardly oriented prongs 468A of the arch-shaped resilient member 468 are sufficiently flexible to bend under the thrust applied by the cam profiles 470 against the inwardly facing surfaces of the profiles 472, thus allowing the capsule retention members 466 to be spaced apart from one another.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A brewing unit for production of a beverage, comprising:
   a brewing chamber comprising two brewing chamber portions movable with respect to each other between an open position and a closed position;
   a capsule guide for guiding a capsule from a capsule insertion aperture to a brewing position in the open position, said capsule guide comprising a pair of capsule guiding channels, the pair of capsule guiding channels being configured to slidingly engage a rim of the capsule in the brewing position;
   a respective capsule retention member arranged at a lower end of each of the pair of capsule guiding channels for retaining the capsule in said brewing position before and during closing said brewing chamber, and for disengaging the capsule from the pair of capsule guiding channels when said two brewing chamber portions are moved apart towards the open position after completion of a brewing cycle; and
   a control member configured to space apart said capsule retention members when said two brewing chamber portions are moved towards said open position for releasing a spent capsule from said capsule retention members upon completion of the brewing cycle, and wherein the control member is further configured to prevent spacing apart of the capsule retention members when said two brewing chamber portions are moved towards the closed position.

2. The brewing unit according to claim 1, wherein said control member comprises a cam profile for each said capsule retention members, said cam profiles acting on said capsule retention members for disengaging the capsule from said capsule retention members when the brewing chamber is opened at the end of the brewing cycle.

3. The brewing unit according to claim 2, wherein said capsule retention members are supported on opposite prongs of an arch-shaped resilient member, said opposite prongs being spread apart by said cam profiles.

4. The brewing unit according to claim 2, wherein each capsule retention member comprises a shaped profile configured to co-act with a respective cam profile of the cam profiles, a movement of the cam profiles during opening of the brewing chamber portions being configured to space apart said capsule retention members.

5. A brewing unit for production of a beverage, comprising:
   a brewing chamber comprising at least two brewing chamber portions movable with respect to each other from an open position to a closed position and vice-versa;
   a capsule guide for guiding a capsule from a capsule insertion aperture to a brewing position, said capsule guide comprising a pair of capsule guiding channels configured to slidingly engage a rim of the capsule;
   a respective capsule retention member arranged at a lower end of each capsule guiding channel for retaininq the capsule in said brewing position before closing said brewing chamber and for disengaging the capsule when said at least two brewing chamber portions are moved apart after completion of a brewing cycle,
   wherein both of the at least two chamber portions are movable with respect to said capsule guide from the open position, for receiving the capsule there between, to the closed position, for completing the brewing cycle, and vice-versa; and
   a control member configured to space apart said capsule retention members when said at least two brewing chamber portions are moved towards said open position for releasing a spent capsule from said capsule retention members upon completion of the brewing cycle,
   wherein said control member comprises a cam profile for each said capsule retention members said capsule retention members being supported on opposite prongs of an arch-shaped resilient member, said opposite prongs being spread apart by said cam profiles,
   wherein each capsule retention member comprises a shaped profile configured to co-act with a respective one of the cam profiles, a movement of the cam profiles during opening of the at least two brewing chamber portions being configured to space apart said capsule retention members, and
   wherein said cam profiles are resiliently deformable, wherein during movement of said at least two brewing chamber portions towards the closed position, the cam profiles are configured to move beyond the shaped profiles while the arch-shaped resilient member is prevented from being deformed.

6. The brewing unit according to claim 2, wherein said cam profiles are arranged for rotation around a rotation axis adjacent said capsule retention members.

7. A brewing unit for production of a beverage, comprising:
   a brewing chamber comprising at least two brewing chamber portions movable with respect to each other from an open position to a closed position and vice-versa;
   a capsule guide for guiding a capsule from a capsule insertion aperture to a brewing position, said capsule guide comprising a pair of capsule guiding channels configured to slidingly engage a rim of the capsule;
   a respective capsule retention member arranged at a lower end of each capsule guiding channel for retaining the capsule in said brewing position before closing said brewing chamber and for disengaging the capsule when said at least two brewing chamber portions are moved apart after completion of a brewing cycle,
   wherein both of the at least two chamber portions are movable with respect to said capsule guide from the open position, for receiving the capsule there between, to the closed position, for completing the brewing cycle, and vice-versa; and a control member configured to space apart said capsule retention members when said at least two brewing chamber portions are moved towards said open position for releasing a spent capsule from said capsule retention members upon completion of the brewing cycle, wherein said control member comprises a cam profile for each said capsule retention members, and wherein said cam profiles are supported for rotation around an axis arranged between the at least two brewing chamber portions when the brewing chamber is open.

8. The brewing unit according to claim 2, wherein said two brewing chamber portions are moved by a single control lever.

9. The brewing unit according to claim 8, wherein said single control lever further controls movement of said cam profiles.

10. The brewing unit according to claim 8, wherein said single control lever is configured to rotate around a rotation axis of said cam profiles and to rotate integrally with said cam profiles.

11. The brewing unit according to claim 8, wherein said single control lever rotates integrally with cranks that are mechanically connected to said two brewing chamber portions, rotation of said single control lever and said cranks being transformed into a sliding movement of said two brewing chamber portions.

12. The brewing unit according to claim 1, wherein said pair of capsule guiding channels are configured to receive the capsule introduced therein by gravity.

13. A brewing unit for production of a beverage, comprising:
a brewing chamber comprising at least two brewing chamber portions movable with respect to each other from an open position to a closed position and vice-versa;
a capsule guide for guiding a capsule from capsule insertion aperture to a brewing position, said capsule guide comprising a pair of capsule guiding channels configured to slidingly engage a rim of the capsule;
a respective capsule retention member arranged at a lower end of each capsule guiding channel for retaining the capsule in said brewing position before closing said brewing chamber and for disengaging the capsule when said at least two brewing chamber portions are moved apart after completion of a brewing cycle,
wherein both of the at least two chamber portions are movable with respect to said capsule guide from the open position, for receiving the capsule there between, to the closed position, for completing the brewing cycle, and vice-versa;
a control member configured to space apart said capsule retention members when said at least two brewing chamber portions are moved towards said open position for releasing a spent capsule from said capsule retention members upon completion of the brewing cycle; and
a water heater, the water heater being movable along with one of said at least two brewing chamber portions during closing and opening of the brewing chamber.

14. The brewing unit according to claim 13, wherein said water heater and said brewing chamber portion movable with said water heater are housed in a slidable cover.

15. The brewing unit according to claim 13 wherein said brewing chamber portion movable with said water heater is in thermal contact with said water heater.

16. The brewing unit according to claim 15, wherein said brewing chamber portion in thermal contact with said water heater comprises a recess for the capsule.

17. The brewing unit according to claim 15, wherein said brewing chamber portion in thermal contact with said water heater is at least partly arranged in a seat formed by a body of said water heater, said body containing a water duct and an electric resistor.

18. The brewing unit according to claim 17, wherein said seat is connected to a through cavity extending along the body of said water heater, a beverage dispensing duct developing along said through cavity.

19. A beverage preparing machine including a brewing unit for production of a beverage, the brewing unit comprising:
a brewing chamber comprising two brewing chamber portions movable with respect to each other between an open position and a closed position;
a capsule guide for guiding a capsule from capsule insertion aperture to a brewing position in the open position, said capsule guide comprising a pair of capsule guiding channels, the pair of capsule guiding channels being configured to slidingly engage a rim of the capsule in the brewing position;
a respective capsule retention member arranged at a lower end of each of the pair of capsule guiding channels for retaining the capsule in said brewing position before and during closing said brewing chamber, and for disengaging the capsule from the pair of capsule guiding channels when said two brewing chamber portions are moved apart towards the open position after completion of a brewing cycle; and
a control member configured to space apart said capsule retention members when said two brewing chamber portions are moved towards said open position for releasing a spent capsule from said capsule retention members upon completion of the brewing cycle, and wherein the control member is further configured to prevent spacing apart of the capsule retention members when said two brewing chamber portions are moved towards the closed position.

20. The brewing unit according to claim 1 wherein both of the two chamber portions are movable with respect to said capsule guide between the open position, for receiving the capsule there between, and the closed position, for completing the brewing cycle.

* * * * *